July 17, 1956     H. T. HOLZWARTH     2,754,655
THRUST CYLINDER WITH INTEGRATED TURBINE
Filed July 13, 1950     3 Sheets-Sheet 1

INVENTOR.
HANS T. HOLZWARTH
BY Virgil F. Davis
Joseph Daleda
ATTORNEYS

July 17, 1956

H. T. HOLZWARTH 2,754,655

THRUST CYLINDER WITH INTEGRATED TURBINE

Filed July 13, 1950

INVENTOR.
HANS T. HOLZWARTH

BY Virgil F. Davico
Joseph Dakda
ATTORNEYS

United States Patent Office 2,754,655
Patented July 17, 1956

2,754,655

THRUST CYLINDER WITH INTEGRATED TURBINE

Hans T. Holzwarth, Westfield, N. J., assignor to The M. W. Kellogg Company, Jersey City, N. J., a corporation of Delaware Application July 13, 1950, Serial No. 173,601

4 Claims. (Cl. 60—35.6)

The present invention relates generally to jet propulsion and more particularly to the integration of the turbine of turbo-pump unit into the thrust cylinder structure of a rocket propulsion system. The disclosure herein is a specific adaptation of the structure disclosed in the copending patent application, Serial No. 164,310, dated May 26, 1950, by M. A. Mayers, now abandoned and assigned to the same assignee.

It is a general object of this invention to integrate a turbine of a turbo-pump unit into a thrust cylinder structure so as to become a structural component thereof.

It is another object of invention to utilize a turbine integrated into a thrust cylinder to simplify and improve the injection of propellants into the thrust cylinder.

A further object of invention is to develop a more efficient injector structure for a thrust cylinder and thereby to secure a better flow pattern for the combustion of the propellant mixture by utilizing the exhaust from an integrated turbine.

A still further object of invention is to design a thrust cylinder with an integrated turbine so that the exhaust from the turbine can be used to protect critical parts of the thrust cylinder by cooling.

Another object of invention is to construct a turbine integrated into a thrust cylinder so that the turbine operation can be regulated in accordance with the thrust load.

The overall object of invention is to develop a thrust cylinder design which can be packaged to have a turbo-pump unit with a turbine and gas generator therefor, as a compact and rugged assembly with a minimum of plumbing.

These and other objects of invention will be apparent from the following description of the invention and from an inspection of the accompanying drawings, of which:

Fig. 4 is a schematic diagram showing a typical apparatus hook-up employing the thrust cylinder with integrated turbine of the invention.

The invention, as specifically disclosed, is particularly applicable to turbo-rocket power plants for aircraft, but is not necessarily limited thereto.

Figure 1:
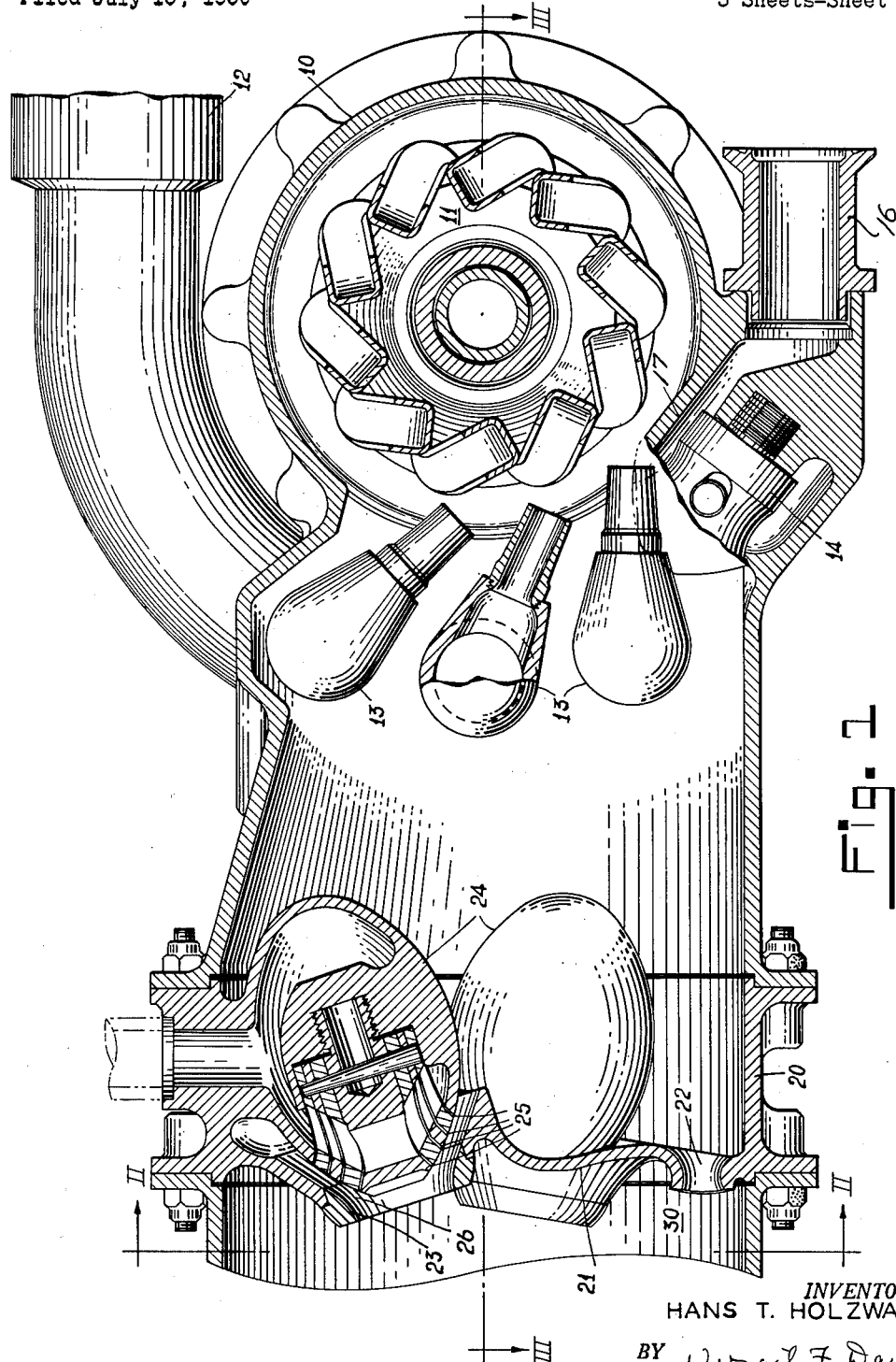
Fig. 1 is a vertical cross sectional view taken along the line I—I of Fig. 3 of one embodiment of the invention.

Referring now to Fig. 1, there is disclosed a turbine pump unit at 10, an injector section at 20, and the thrust cylinder or combustion chamber at 30. For purposes of clarity, only one turbine structure will be described since the turbine design details are immaterial to the objects of this invention.

The source of motive fluid for one of the turbines 11 is disclosed as a gas generator at 12, the motive fluid, consisting of the products of decomposition of a monopropellant, such as hydrazine and a catalyst, or of bi-propellants, such as gasoline and white fuming nitric acid, being exhausted at relatively high temperature and pressure into the thrust cylinder.

A disclosed set of three nozzles 13, duplicated for each turbine, is used for directing the motive fluid against the turbine 11, here shown in a design for peripheral flow, the turbine wheel being assembled by conventional methods. With appropriate structural changes, an axial flow design could be used instead.

In those cases where an idling requirement exists, or for part load performance, a number of gas generators of different sizes could be used to take full advantage of the potential efficiency of the turbine, instead of using hand valve arrangements to control the motive fluid flow from a single generator. Then the nozzles could be dimensioned and grouped according to idling or part load requirements, with each nozzle group connected to a separate gas generator, the operation of which is regulated on the liquid side of the flow, to avoid the complications of regulating valves designed for large volume, high temperature gas flows.

The amount of a propellant, e. g. hydrazine, which is required for efficient operation of the thrust cylinder, in excess of that used for operation of the turbine, may be injected into the turbine exhaust. Such a typical injector is disclosed at 14, arranged in a region of high gas velocities where a rapid and intensive atomization of the injected propellant is possible.

The power developed by the turbine is used by the turbo-pump for pressurization of the propellant components in the system. Centrifugal pumps 15 are used in the disclosed construction, with each impeller mounted directly on the turbine disc driving it, making each of the two rotors of the turbo-pump a structural unit.

The injector section 20 separates the thrust cylinder or combustion chamber 30 from the turbine exhaust region. This injector section consists of a diaphragm 21 with a plurality of orifices 22 and openings 23 for the turbine exhaust. The three groups of three orifices each, at 22, direct the comparatively cool exhaust gases towards the interior wall of the thrust cylinder to form a protecting layer of cool gas since the temperature of the exhaust gases are lower than the thrust cylinder combustion gases. These orifices can be arranged so as to provide a tangential velocity component insuring an uninterrupted layer along the thrust cylinder wall and obviating or diminishing the need for regenerative cooling of the thrust cylinder wall.

The thrust cylinder efficiency will be reduced if the turbine exhaust gases, used for cooling, are withheld from further chemical reaction within the thrust cylinder. For maximum thrust, these gases should be combined chemically in the thrust cylinder at or near the stoichiometric mixture ratio.

Injectors 24 are positioned centrally with respect to the openings 23 and for injection of a propellant component are provided with narrow circular slots 25, a typical width of slots measuring 0.004". The hot exhaust gases flowing through channels 26, defined by the edges of openings 23 and the injectors 24, impinge at a high velocity upon the droplets of the propellant components injected at a low velocity (about 50 ft./sec.) and achieve not only optimum atomization by shear action but also some vaporization in the resulting mixture, so that good combustion in the thrust cylinder is assured. It has been found that even a small pressure drop, as from 475 to 450 p. s. i. a., is sufficient to impart to the gases, the considerable velocity of 600–700 ft. sec. At this velocity, the pressure drop required for injection can be reduced below that required for solid injection, since thorough atomization and mixture results upon impingement by this high velocity gas, so that the requirements for the perfection of injector orifices can be reduced.

As disclosed, the center lines of the injectors 24 intersect on the central axis of the thrust cylinder approximately at the center.

As indicated at length in the abandoned application of

Figure 2:
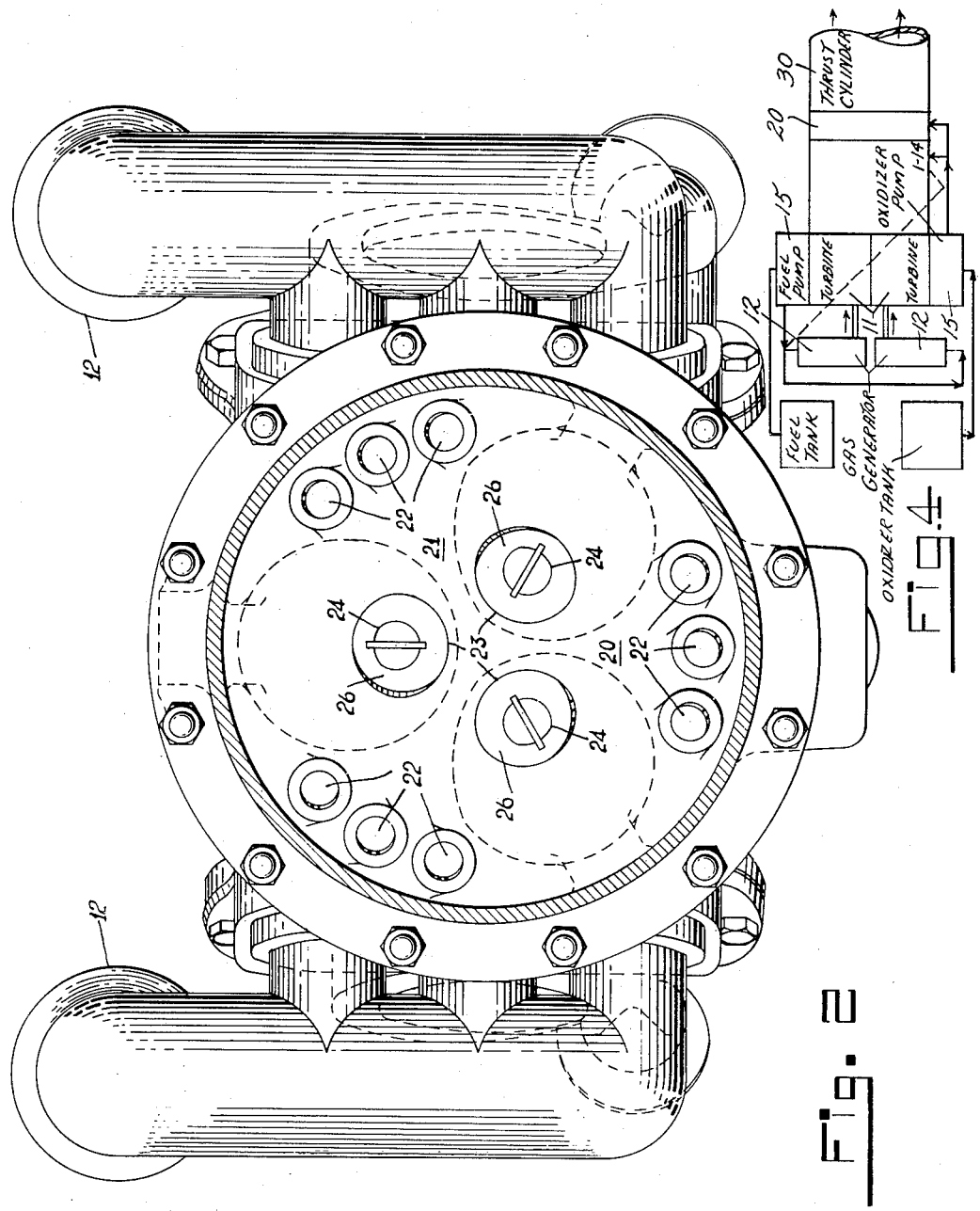
Fig. 2 is an elevation looking toward the injector section taken at line II—II of Fig. 1.
Figure 3:
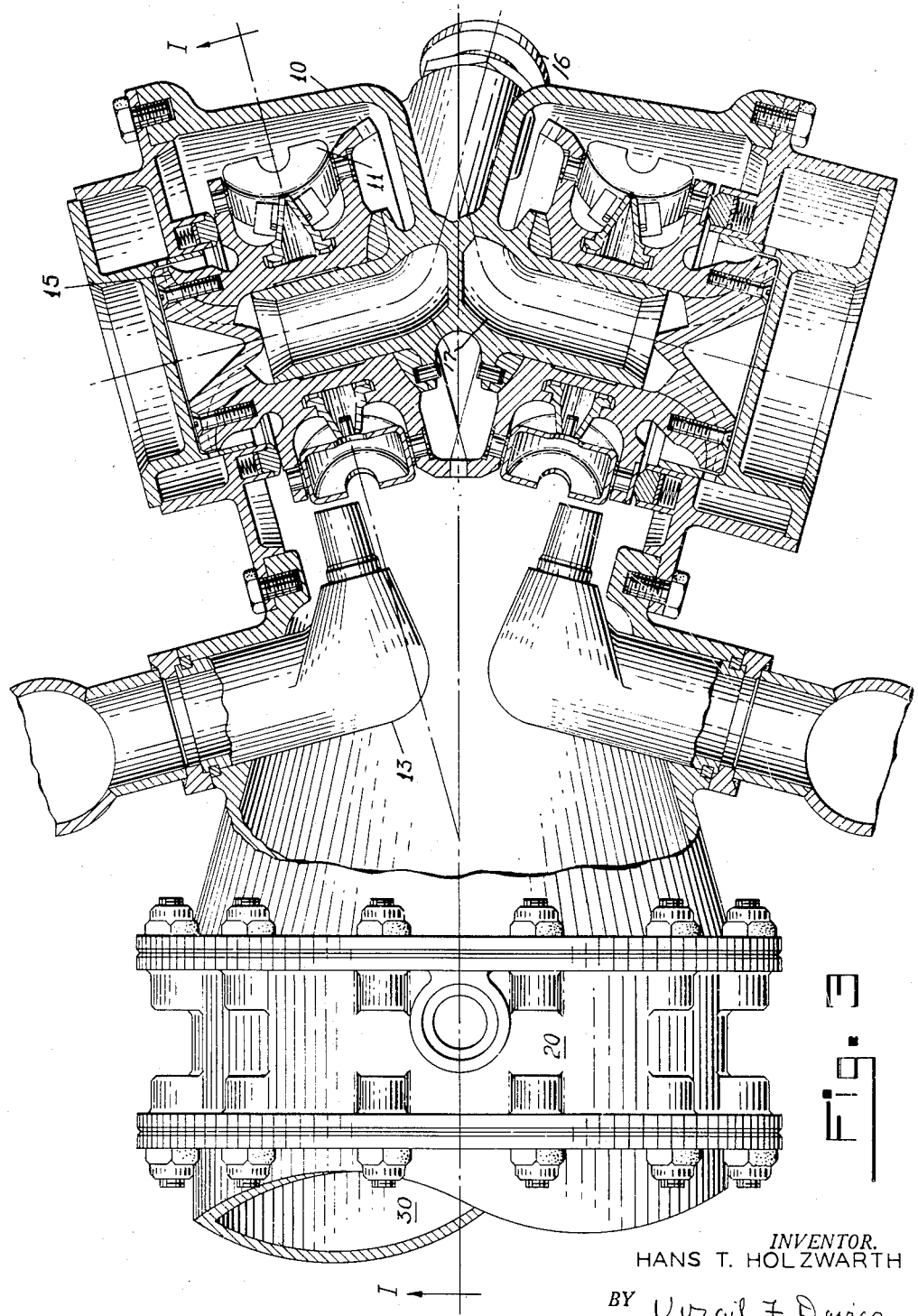
Fig. 3 is a partly cross sectional view in a horizontal plane through the longitudinal axis taken on the line III—III of the embodiment of Fig. 1.

Martin A. Mayers, above identified, either a mono-propellant or a bi-propellant may be employed to drive the turbine of the turbo pump set. The operation is such that with either type of propellant all of the available energy in the propellant supplied to the gas generator is not released in the gas generator. Only enough energy is there released to provide a sufficient volume of motive fluid at a temperature for proper operation of the turbine. The remainder of the available energy is finally completely released by combustion in the thrust cylinder. As disclosed in said Martin A. Mayers' application and noting particularly Fig. 2 thereof which illustrates the case of the mono-propellant, the motive gas after driving the turbine passes to the thrust cylinder wherein it encounters a volume of a component necessary to insure its complete combustion in the thrust cylinder. Thus, even in the case of a mono-propellant, a second component is used to assure combustion in the thrust cylinder. In the case of bi-propellants, illustrated particularly in Fig. 3 of said Mayers' application, both of the propellant components pass to the gas generator to provide the motive fluid for the turbine and the available energy of at least one of said components is not completely released in the gas generator. The amount of one of the components required to assure complete release of the available energy of both of the components by combustion is supplied to the thrust cylinder downstream of the entrance of the turbine exhaust therein.

Applicant's disclosure, being as stated heretofore a specific adaptation of the structure disclosed in said application of Martin A. Mayers, operates the novel device in a manner similar to that disclosed in said Mayers' application. Fig. 4 of the drawings of the present application illustrates the use of a mono-propellant, hydrazine, to drive the turbo pump sets. The fuel, hydrazine, passes from a suitable fuel tank to its respective one of the pumps 15. The fuel after being pressurized at said pump 15 passes to the gas generators 12 to be decomposed therein by catalytic action to the degree required to provide motive fluid in proper volume and at proper temperature for the turbines 11. Only a portion of the available energy of the fuel, hydrazine, is released in the gas generators 12. The motive fluid passes to the turbines 11 to drive the same and their associated pumps 15. The exhaust from the turbines passes the injector section 20 to flow therethrough to finally pass into the combustion chamber 30 for combustion therein. As stated heretofore, the amount of hydrazine which is required for efficient operation of the thrust cylinder 30 in excess of that used for operation of the turbines 11 may as shown in Fig. 4, be made to bypass the gas generators 12 and pass directly to the injector 14. The material required for complete combustion of the turbine exhaust, in this case an oxidizing material, passes from the oxidizer tank to its respective one of the pumps 15. The oxidizing material after having been pressurized by its pump 15 is introduced in the region of the injector 14 to encounter the turbine exhaust. The remainder of the pressurized oxidizing material is introduced at section 20 and particularly at the injectors 24 thereof to secure optimum atomization and intermixing so that good combustion in the thrust cylinder 30 is assured.

Although many changes can be made in the disclosed apparatus without departing from the scope of the invention, it is intended that all matter contained in the above description and shown in the accompanying drawings shall be interpreted as illustrative and not limitative.

What is claimed is:

1. In a propulsion unit adapted to convert energy liberated by fluid propellant into thrust, comprising a turbine for driving an element of said propulsion unit, an injector section, and a thrust cylinder, said turbine and said injector section being integrated into said thrust cylinder to provide a flow path for the exhaust from said turbine through said injector section into said cylinder, means for converting fluid propellant into intermediate decomposition products and energy for use as motive fluid in said turbine, means for presenting said motive fluid to said turbine for energy absorption thereby, said injector section comprising a plurality of fluid propellant injectors adapted to inject fluid propellant into said thrust cylinder for substantially complete decomposition and energy release therein, and a diaphragm with orifices and openings across the path of said exhaust through said injector section, each of said injectors being mounted centrally of a respective one of said openings for intimate mixture of the said exhaust with the injected fluid propellant, said orifices disposed near the periphery of said diaphragm and oriented to direct said exhaust flowing therethrough against the wall of said thrust cylinder.

2. In a propulsion unit as defined in claim 1, in which the external surfaces of said injectors and the walls of said openings are so relatively shaped that the velocity of said exhaust as it passes said injectors is substantially greater than its velocity before it enters said openings whereby intimate intermixing of said injected propellant and said exhaust is facilitated.

3. In a propulsion unit in which thrust is developed by the decomposition of a fluid propellant within a thrust cylinder, an apparatus for injecting said propellant into said cylinder which includes: a diaphragm structure enclosing the upstream end of said cylinder, said diaphragm structure being provided with a plurality of orifices; an injector section comprised of a short, substantially cylindrical conduit merging into said thrust cylinder at said diaphragm; a turbine for driving an element of said propulsion unit, said turbine being mounted at the upstream end of said injector section, and the discharge of said turbine opening directly into the upstream end of said injector section; means for partially decomposing a minor portion of said propellant and for conducting said products of decomposition to said turbine as motive fluid therein; injectors for injecting the major portion of said propellant into said thrust cylinder through at least some of said orifices in said diaphragm, said injectors concentrically positioned relative to their respective orifices to provide a high velocity flow path around each of said injectors for the combustion products passing to said respective orifices so that said major portion of said propellant is atomized by decomposition products from said turbine passing from said injector section to said thrust cylinder by way of said orifices.

4. An apparatus as described in claim 3 in which orifices near the periphery of said diaphragm direct relatively cool turbine exhaust gases, without the addition of any propellant, adjacent the interior wall surfaces of said thrust cylinder, and the orifices at which said propellant is introduced are directed away from the interior wall surfaces of said thrust cylinder.

References Cited in the file of this patent

UNITED STATES PATENTS

| | | |
|---|---|---|
| 2,351,750 | Fawkes | June 20, 1944 |
| 2,397,659 | Goddard | Apr. 2, 1946 |
| 2,408,111 | Truax et al. | Sept. 24, 1946 |
| 2,434,298 | Truax | Jan. 13, 1948 |
| 2,479,888 | Wyld | Aug. 23, 1949 |
| 2,511,385 | Udale | June 13, 1950 |
| 2,531,761 | Zucrow | Nov. 28, 1950 |
| 2,551,115 | Goddard | May 1, 1951 |
| 2,566,373 | Redding | Sept. 4, 1951 |
| 2,617,361 | Neal | Nov. 11, 1952 |

FOREIGN PATENTS

| | | |
|---|---|---|
| 276,911 | Italy | Aug. 22, 1930 |

OTHER REFERENCES

Astronautics #34, June 1936, pages 8–13.

"Aero Digest," November 1947, pages 38–41, 116, 119–120.